W. P. SCHANCK.
MILK PAIL.
APPLICATION FILED FEB. 17, 1910.

978,401.

Patented Dec. 13, 1910.

WITNESSES:
D. Gurnee
C. W. Carroll

INVENTOR:
Willard P. Schanck
by his attorneys
Osgood, Davis & Dorsey

UNITED STATES PATENT OFFICE.

WILLARD P. SCHANCK, OF AVON, NEW YORK.

MILK-PAIL.

978,401.  Specification of Letters Patent.  Patented Dec. 13, 1910.

Application filed February 17, 1910. Serial No. 544,471.

*To all whom it may concern:*

Be it known that I, WILLARD P. SCHANCK, a citizen of the United States, and resident of Avon, in the county of Livingston and State of New York, have invented certain new and useful Improvements in Milk-Pails, of which the following is a specification.

This invention relates to milk pails such as are used as receptacles in the operation of milking.

The object of the invention is to produce a milk pail which shall be simple and inexpensive in construction, convenient in use, and easy to keep in clean and sanitary condition, and particularly to produce a milk pail and a funnel therefor so formed and arranged that in the operation of milking the milk shall not spatter back out of the funnel.

To the above ends the invention consists in the milk pail, and the funnel therefor, hereinafter described, as it is defined in the succeeding claims.

Figure 1:
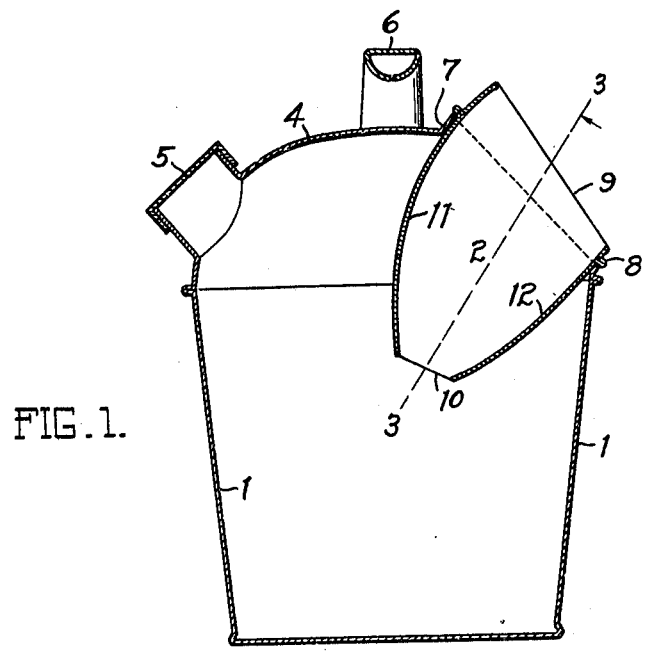
Figure 2:
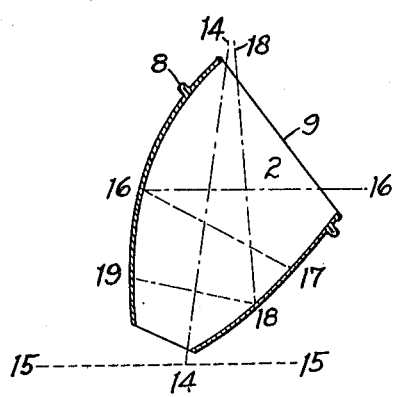
Figure 3:
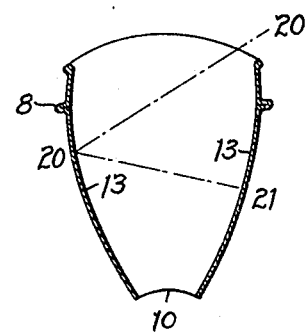

In the drawings, which illustrate the preferred embodiment of my invention: Figure 1 is a median vertical section of a milk pail embodying the present invention; Fig. 2 is a similar view of the funnel alone, showing diagrammatically the effect of the funnel upon streams of milk directed into it; and Fig. 3 is a section on the line 3—3 in Fig. 1.

The illustrated embodiment of my invention comprises a milk pail body 1 of ordinary form, and a funnel designated generally by the reference number 2. The top of the body 1 is closed by a convex permanent cover 4 provided with a pouring outlet covered by a removable cap 5. A handle 6 of ordinary form is also fixed to the cover 4. The funnel 2 is removably seated in an opening in the cover 4, this opening being provided with a narrow upwardly-projecting collar 7 into which the funnel fits closely but freely. A flange 8 near the inlet end of the funnel rests upon the collar 7 and supports the funnel in proper position in the opening.

The novelty of the invention resides particularly in the form of the funnel, together with the position in which it is mounted in the pail body. As shown in Figs. 1 and 2, the funnel is provided with a direct passage having the general direction of the line 3—3, so that milk directed into the funnel may enter the pail either without touching the walls of the funnel at all, or with a minimum amount of contact therewith. The funnel has a wide inlet opening 9 and a restricted outlet opening 10, and the inlet opening is somewhat oblique, while the funnel as a whole is inserted in oblique position in the body 1. From this arrangement it results that the uppermost extremity of the funnel completely overhangs the outlet opening 10. This arrangement renders it impossible to direct a stream of milk through the funnel in such a direction that this stream, when striking the surface of the body of milk standing in the body of the pail, shall rebound or spatter in such direction as to pass out again through the inlet of the funnel. This feature of the pail is illustrated particularly in Fig. 2. The dot and dash line 14—14 indicates the course of a stream of milk entering under the most adverse circumstances with respect to this feature of operation, and the horizontal line 15—15 represents the upper surface of the milk in the pail. It will be obvious that milk entering in the direction 14—14 will rebound in such direction as to splash either entirely outside of the funnel and within the pail body, or be projected against the inner surface of the funnel opposite to the inlet opening thereof. Since it is necessary also to guard against spattering where the stream of milk is directed through the inlet opening 9 in such direction as to impinge directly against the inner surface of the funnel, I form this inner surface in such a manner that streams of milk striking it at any angle likely to occur in practical operation, or preferably at any possible angle, shall tend to rebound or spatter within the funnel and not out again through the inlet opening. To this end I employ a concave inner surface in my funnel.

Since the streams of milk will in practice be, for the most part, directed in a downward direction, any substantial concavity may operate to secure the desired result under most practical conditions, but for the most complete embodiment of my invention it is necessary that every portion of the inner surface of the funnel be so formed that a normal to any part of this surface shall intersect the opposite wall of the funnel and not pass through the inlet opening. In the drawings I have illustrated such a complete embodiment, the funnel in this case having from end to end, and around its entire circumference, a concave inner surface of the form described.

In Fig. 2 I have illustrated by dot-and-dash lines the courses followed by streams of milk entering at various angles. If, for example, a stream of milk enter horizontally and close to the lower extremity of the inlet opening, which may be considered an extreme case such as would scarcely arise in practice, the milk enters on the line 16—16 and, assuming the angle of rebound to be the same as the angle of incidence, so much of the milk as spatters will be projected across the funnel and will then strike the opposite wall at the point 17. The milk so entering will not, therefore, spatter back to any substantial extent through the inlet opening 9. An opposite case is indicated by the line 18—18, the milk being projected close to the upper extremity of the inlet opening and striking against the lower wall of the funnel. In this case the milk will rebound or spatter in the general direction of the point 19.

In Fig. 3 the line 20—20 illustrates an extreme case in which the milk is projected at an inclination transversely with respect to the funnel. In this case the milk tends to splash in the general direction of the point 21.

While in the preferred embodiment of my invention I form the entire inner surface of the funnel concave, as above described, it will be apparent that this formation is most important with respect to the part of the surface opposite to the direction of inclination of the inlet opening, and embodiments of my invention of practical utility may be made in which the side walls and the front wall of the funnel are substantially straight in a longitudinal direction.

I am aware that it has been previously attempted to make milk pails in which the spattering of milk through the inlet opening is reduced or eliminated, but all such devices as have been previously proposed have been defective in that they provide either more or less tortuous passages for the milk, thereby involving an unnecessary amount of contact between the milk and the surfaces of the receptacle, or that they are complicated in form, difficult to clean, and expensive to manufacture.

I claim:

1. A funnel for milk pails having a direct passage therethrough terminating in a wide inlet and a restricted outlet, and a longitudinally-curved concave inner surface between the inlet and the outlet.

2. A funnel for milk pails having a direct passage therethrough terminating in a wide inlet and a restricted outlet, and a longitudinally-curved concave inner surface between the inlet and the outlet and extending substantially entirely around the funnel.

3. A funnel for milk pails having a direct passage therethrough terminating in a wide inlet and a restricted outlet, and longitudinally-curved concave inner surface extending substantially from the inlet to the outlet.

4. A funnel for milk pails having a direct passage therethrough terminating in an oblique wide inlet and a restricted outlet, and a longitudinally-curved concave wall opposite the inlet.

5. A funnel for milk pails having a direct passage therethrough terminating in a wide inlet and a restricted outlet, and an inner surface formed to a longitudinally-concave curve such that a normal to such surface at any point intersects the opposite wall of the funnel.

6. In combination with the body of a milk pail, a funnel removably mounted in said body and having a direct passage therethrough terminating in a wide oblique inlet and a restricted outlet, the outlet of the funnel being arranged vertically beneath the upper wall of the funnel.

7. In combination with the body of a milk pail having a fixed top provided with an inclined opening, a funnel removably mounted in said opening and having a direct passage therethrough terminating in a wide inclined inlet and a restricted outlet, and a longitudinally-concave inner surface between the inlet and the outlet, the outlet of the funnel being arranged vertically beneath the upper wall of the funnel.

WILLARD P. SCHANCK.

Witnesses:
FARNUM F. DORSEY,
D. GURNEE.